J. P. NIKONOW.
INCLINOMETER AND ACCELEROMETER.
APPLICATION FILED MAY 23, 1918.
1,285,331.
Patented Nov. 19, 1918.
2 SHEETS—SHEET 1.
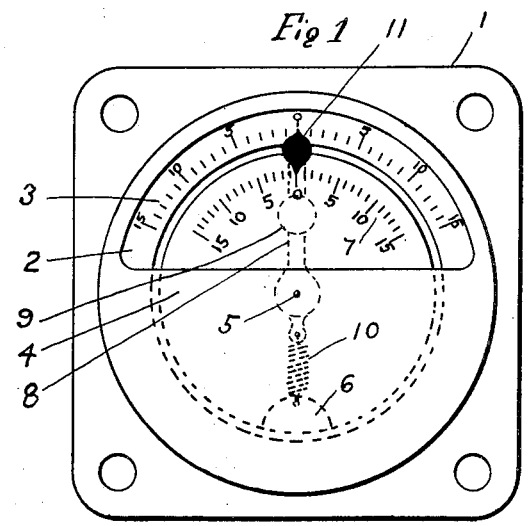
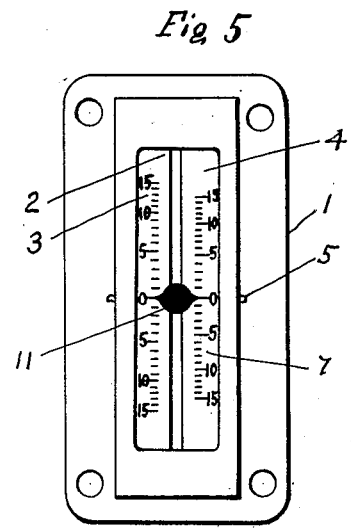
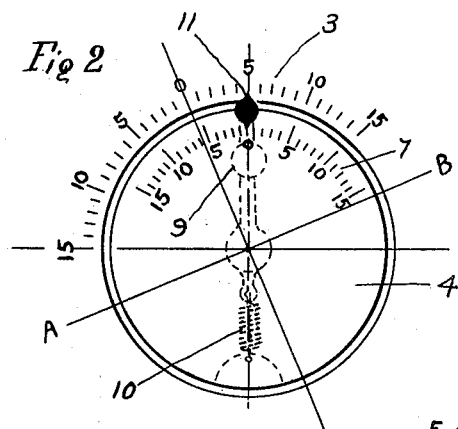
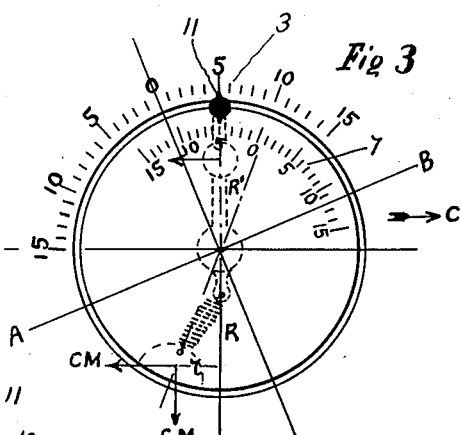
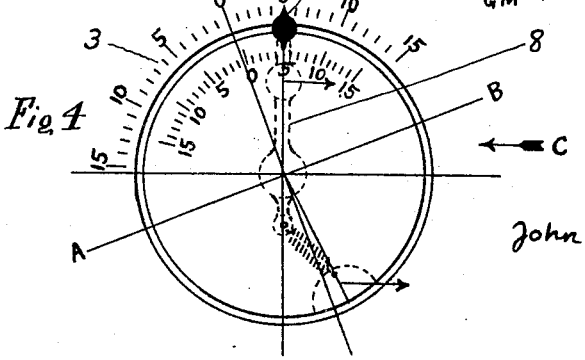
Witnesses:
Edward J. Lang
INVENTOR
John P. Nikonow

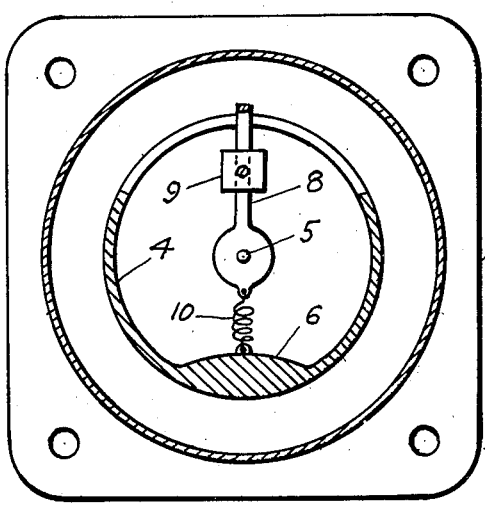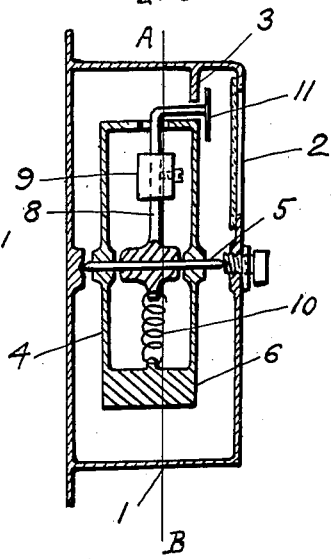

UNITED STATES PATENT OFFICE.

JOHN P. NIKONOW, OF BRIDGEPORT, CONNECTICUT.

INCLINOMETER AND ACCELEROMETER.

1,285,331.   Specification of Letters Patent.   Patented Nov. 19, 1918.

Application filed May 23, 1918. Serial No. 236,096.

*To all whom it may concern:*

Be it known that I, JOHN P. NIKONOW, a Russian citizen, and a resident of Bridgeport, in the county of Fairfield and State of Connecticut, have invented a new and useful Improvement in Inclinometers and Accelerometers, of which the following is a specification.

My invention relates to the inclinometers and accelerometers for moving vehicles, such as airplanes, automobiles, etc., and has a particular reference to such mechanisms, as employ complex pendulums to register both the angular position of the vehicle and its rate of acceleration.

The object of my invention is to provide a simple and convenient mechanism, with which a pilot of the vehicle, such as an airplane, could know at all times its angle of descent or ascent and also its rate of acceleration.

In the construction of the inclinometers for moving vehicles difficulties have been encountered, because an ordinary pendulum does not maintain a vertical position, being deflected more or less by the forces of acceleration and deceleration; also by the centrifugal force, if a vehicle moves on a curved path.

According to my invention I employ two pendulums, flexibly connected to each other, one pendulum being in an inverted position at 180 degrees to the other ordinary pendulum, both of these pendulums being adapted to be actuated by forces of inertia due to the acceleration. The changes in angular position between these pendulums indicate degree of acceleration of the vehicle, the inverted pendulum being adapted to maintain a vertical position under all conditions, thereby indicating the correct angle of the vehicle or its inclination.

The details of my invention will be described in connection with the accompanying drawings, in which—

Figure 1 represents an elevation of my instrument, as adapted to indicate side movements of a vehicle, Fig. 2 represents a diagrammatical view of my indicator, when the vehicle is inclined. Fig. 3 represents the same condition, but with the distortion, caused by the force of acceleration. Fig. 4 the same with the direction of acceleration reversed. Fig. 5 shows a modification of my indicator, as adapted for indicating longitudinal or axial inclinations of a vehicle. Figs. 6 and 7 show sectional elevation of my device, illustrating more clearly the suspension of the first pendulum or drum and of a second or inverted pendulum.

My indicator consists of a frame 1, attached to the body of the vehicle (not shown). This frame has an opening 2, through which a stationary scale 3 can be seen. A drum 4 is suspended inside of the frame 1 on a shaft 5. This drum has a weight 6 and a scale 7, arranged so, that its 0 mark corresponds with the 0 mark on a stationary scale, when the vehicle stands in a horizontal position. This drum represents an ordinary pendulum and tends to remain in a vertical position under action of the force of gravity, being however more or less deflected by the forces of inertia due to irregularities in the speed of the vehicle and its acceleration.

In order to separate deflections, due to the angular position of the vehicle, from deflections caused by the acceleration, I employ another, inverted or corrective pendulum 8, suspended on the same axis 5, but with its center of gravity (weight 9) above the axis. It is held in such position by means of a spring 10, which tends to keep, in one line the two centers of gravity and the axis 5. This inverted pendulum has a pointer 11 with two ends, pointing to the stationary and movable scales respectively. The weight 9 is smaller than the weight 6, so that the whole system tends to remain vertical with the weight 6 down.

Figs. 2, 3 and 4 explain the operation of my indicator under various conditions. Fig. 2 shows the simplest case, when the vehicle is inclined, but moving with uniform velocity (or standing still). The pendulum 11 indicates on a stationary scale 3 an angle, which the axis of the vehicle (A—B) makes with the horizontal line, and this angle is shown to be 5 degrees. The lower end of a pointer 11 points toward 0 mark on a movable scale, indicating, that the vehicle neither gains, nor loses any speed.

Fig. 3 represents a case of a vehicle moving at the same angle of 5 degrees, but with an acceleration, as indicated by the arrow C. The inertia of the weight 6 will cause its deflection from the vertical line, until the moment $C M R$ is balanced by the momentum $g M R$, where $M$ is a mass of the pendulum, $R$— distance of its center of gravity from the axis 5, $g$— gravity acceleration and $r$— horizontal deflection of the center of gravity. The movable scale, attached to the drum, deflects at a corresponding angle, as shown.

But the same acceleration will deflect the inverted pendulum 8 in the same direction, until the moment $C m R'$, due to inertia, will be balanced by the force $F$ of the spring 10. $m$ in this case denotes the mass of the inverted pendulum and $R'$— distance of its center of gravity from the axis 5. With properly selected spring 10 the inverted pendulum 8 will remain vertical, its pointer indicating on a stationary scale the correct angle of inclination. The lower end of the pointer 11 will indicate at the same time on a movable scale the rate of acceleration in degrees, also direction of the acceleration.

Fig. 4 shows the same case, but with the direction of the acceleration reversed. In this case the weight 6 will deflect in the opposite direction, until again balanced by the force of gravity. This will produce again enough tension on the spring 10 so as to keep it in a vertical position, as shown.

It is easy to see, that with the proper proportion of the spring and weights it is possible to obtain an arrangement, that the inverted pendulum will remain vertical under all conditions of acceleration. Then the force of gravity, passing through its axis of rotation, cannot form any turning moment, so that the amount of deflection, or rather resistance to the deflection can be regulated exclusively with the spring 10 and weights 6 and 9.

As is shown on drawings, there is a clearance between the stationary scale and the drum, sufficient for the end of the pendulum 8 to pass outside, forming a pointer 11.

Fig. 5 represents a modification, in which the stationary scale 3 is a form of a drum side by side with the movable drum 4. The pointer 11 moves in a clearance between these drums, and for convenience may be attached at an angle with the pendulum 8.

An important advantage of my invention is, that my indicator can indicate correctly the angular position of the vehicle, regardless of variations in speed, and, at the same time, the rate of changes of its speed.

I claim as my invention:

1. In an inclinometer and accelerometer, the combination with a housing, a drum pendulum, rotatively mounted in said housing, another pendulum, having the same axis of rotation with said drum pendulum, and means to measure relative movements of said pendula.

2. In an inclinometer and accelerometer, the combination with a housing, a pendulum, rotatively mounted in said housing, another pendulum, mounted in said housing and having the same axis of rotation with said first pendulum, spring connection between said pendula and means to measure movements of each of said pendula.

3. In an inclinometer and accelerometer, the combination with a housing, a pendulum, rotatively mounted in said housing, means to measure relative movements between said pendulum and said housing, another pendulum, mounted on the same axis with said first pendulum, a flexible connection between said pendula and means to measure relative movements between said pendula.

4. In an inclinometer and accelerometer, the combination with a housing, a plurality of pendula in said housing, spring connection between said pendula and means to measure relative movements between said pendula and between said pendula and said housing.

5. In an inclinometer and accelerometer, the combination with a housing, plurality of pendula in said housing, having the same axis of rotation, flexible connection between said pendula, means to measure relative movements between said pendula, and means to measure relative movements between said pendula and said housing.

6. In an inclinometer and accelerometer, the combination with a housing, a pendulum, rotatively mounted in said housing, another pendulum of a lighter weight than said first pendulum, flexible connection between said pendula, means to maintain said second pendulum in an inverted position and means to measure the relative movements of said pendula.

7. In an inclinometer and accelerometer, the combination with a housing, a plurality of pendula, rotatively mounted in said housing and in angular relation to each other, flexible connection between said pendula, means to maintain said angular relation and means to measure the relative movements of said pendula.

8. In an inclinometer and accelerometer, the combination with a housing, a pendulum, rotatively mounted in said housing, another pendulum, mounted in an inverted position in relation to said first pendulum and at an angle of 180 degrees, a flexible connection between said pendula, means to maintain said second pendulum in an inverted position, and means to measure the relative movements of said pendula.

In testimony whereof, I have hereunto subscribed my name this 14th day of May, 1918.

JOHN P. NIKONOW.

Witness:
KATHARINE McNEIL.